Feb. 26, 1963 L. REEVE 3,079,222
FLUIDISED BED PROCESS AND APPARATUS FOR USE THEREIN
Filed Nov. 9, 1959 2 Sheets-Sheet 1

Inventor
Lewis Reeve

By
Bailey, Stephens o'Neill
Attorneys

Feb. 26, 1963 — L. REEVE — 3,079,222
FLUIDISED BED PROCESS AND APPARATUS FOR USE THEREIN
Filed Nov. 9, 1959 — 2 Sheets-Sheet 2

Inventor
Lewis Reeve
By
Bailey, Stephens & Huettig
Attorneys

United States Patent Office 3,079,222
Patented Feb. 26, 1963

3,079,222
FLUIDISED BED PROCESS AND APPARATUS
FOR USE THEREIN
Lewis Reeve, Scunthorpe, England, assignor to
The United Steel Companies Limited
Filed Nov. 9, 1959, Ser. No. 851,719
2 Claims. (Cl. 23—1)

In processes in which particulate solid material is fluidised by the upward passage of gas, for the purpose of bringing about change in the solid or gas or both, it is usual to provide an apertured support through which the gas is forced upwards into the solid particles to fluidise them. When the gas is not flowing the solid particles fall downwards, and it is desirable that they should settle down on the support as a bed and should not flow downwards through the support. To achieve this result the openings in the support which serve to distribute the gas uniformly are normally made small enough to prevent the solid particles from passing through them.

In some fluidised bed processes, use is made of a container which is divided into compartments by two or more horizontal supports, on each of which a fluidised bed is formed in operation. In a container of this kind the material to be treated is usually introduced into the container at the top and during the fluidising operation passes through overflow pipes from each compartment to the one below. I have found that a support having openings which substantially prevent the passage of the particles, particularly if these are made as described in our British Patent No. 811,366, is very satisfactory as either the sole support or the lowermost of several supports, but that such a support is not satisfactory when used above another. The reason is that the gas picks up dust flowing through the fluidised material above the bottom support, and some of this dust is deposited in and gradually blocks the openings in the supports above.

The objects in this invention are to provide an improved apertured support and to facilitate the operation of fluidised bed processes.

Broadly in a process according to the present invention gas is passed upwards into the material to be fluidised through a plurality of openings large enough for the particles of the material to pass through them, and on the shut-off of the gas supply the openings are sealed by building up a heap of said material beneath each of them. To bring about this sealing the openings are made large enough for the material to pass through them and below each opening there is a baffle at such a vertical distance below and extending so far laterally beyond the opening as to enable material that passes through each opening when no gas is flowing to build up on the baffle as a heap sealing the opening.

The invention is particularly useful in containers having two or more supports. In such containers the bottom support is preferably constructed as described in the said British Patent No. 811,366, because there is a slight tendency for the heap formed below an opening in a support according to the present invention to allow a little material to dribble downwards when the gas is flowing. This dribble ceases completely when gas blowing stops. Whilst some slight dribble during operation from the upper compartments into the lower one is not objectionable, dribble into the blowing box below the bottom compartment is undesirable.

The invention will now be described in more detail by way of example with reference to the accompanying drawings, in which.

Figure 1:
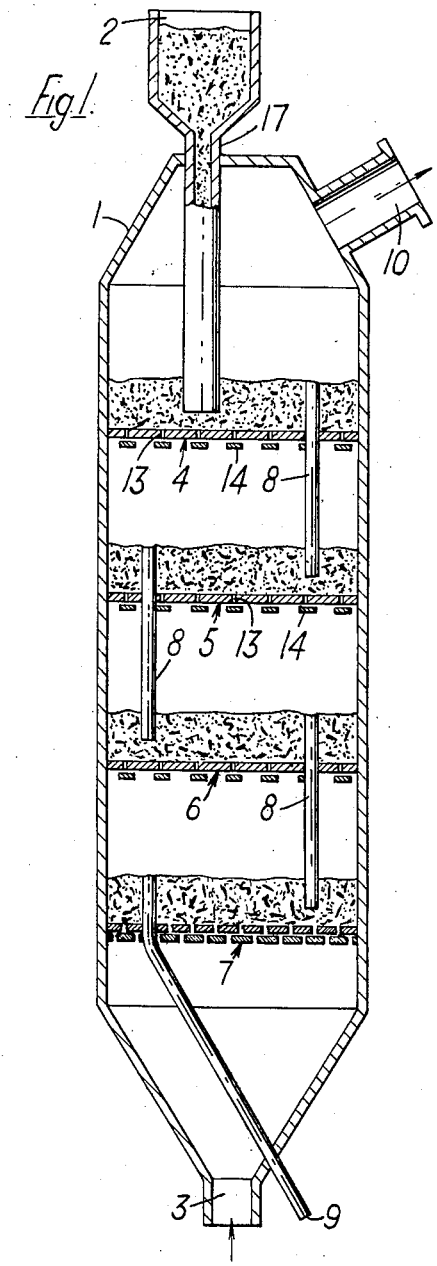
FIGURE 1 is a diagrammatic view of a multi-bed container.
Figure 2:
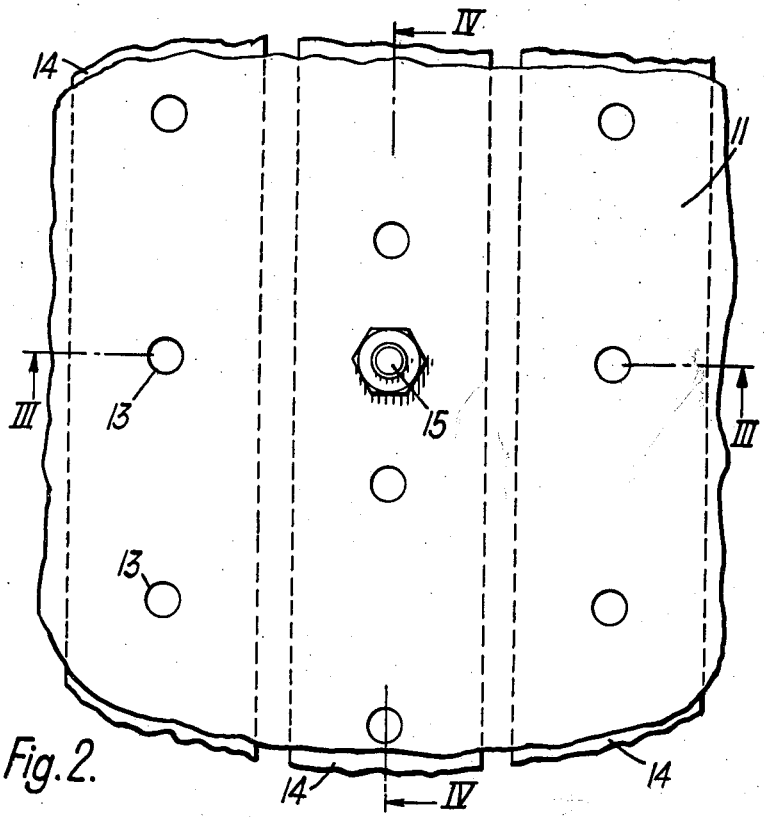
FIGURE 2 is a plan of part of a support.
Figure 3:
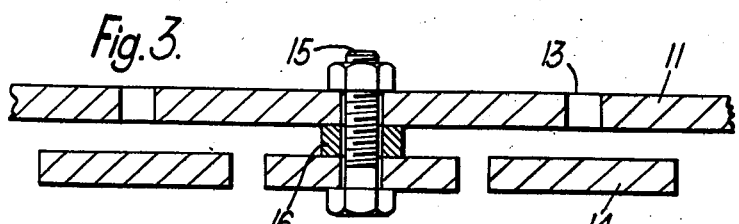
FIGURES 3 and 4 are sections on the line III—III and IV—IV respectively in FIGURE 2.
Figure 4:
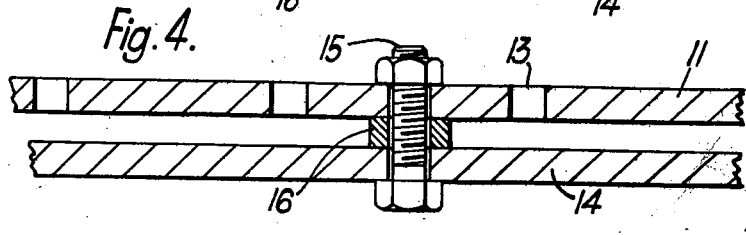

The container shown at 1 is a cylindrical vessel with a top hopper 2 for solid particles into which solid particles pass from a hopper 2 through a pipe 17. The vessel is divided into compartments by four horizontal supports 4, 5, 6 and 7. Downflow pipes 8 enter openings in the supports and extend up from them to levels desired for the tops of the fluidised beds formed on the supports in operation. The lower end of the pipe 17 and of each pipe 8 lies at a little distance above a support. The material flows downwards through the pipe 8 from each bed to the next and finally out of the container 9. The gas enters the container through a bottom inlet 3 and leaves it by a top outlet 10.

The container shown is designed to receive particles of iron ore all passing through a 16-mesh but retained by a 100-mesh B.S.S. sieve, which are to be fluidised by industrial gas from which hydrogen sulphide is to be removed by the fluidised ore. Each of the supports 4, 5 and 6 consists of a metal plate 11. In each of these plates circular holes 13, ¼ inch in diameter are drilled in rows with distances of 1⅞ inch between the centres of the holes; and below these holes there are baffles 14 formed by strips of metal 1½ inch wide each with its centre line lying immediately beneath the line joining the centres of a row of the holes 13, each strip leaving a gap of ¼ inch between itself and the plate 11. The strips are held by bolts 15 passing through the plate into and through the strips, and washers or nuts 16 are used to ensure that the desired gap is left.

The support 7 is constructed as shown in British Patent No. 811,366.

Naturally the openings that allow the material to pass may be slots rather than drilled holes. In general, the total cross-sectional area of the openings should be adjusted so as to be about 3% of the area of the support. The width of the slots or the diameter of the circular holes should preferably be not less than 5 times the size of the largest particle in the fluidised solids; e.g. in the case of the 16–100 mesh particles, the diameter of the holes should not be less than 0.2".

There may be a separate baffle beneath each opening instead of a strip extending beneath a number of openings; and the gap between the plates of the support and the baffles below it may vary provided that the dimensions are all so correlated as to ensure that when the flow of gas ceases a pyramidal or like heap builds up on the baffle below the opening to seal the opening.

Moreover, the supports and baffles may be of brickwork or other refractory material, which may be supported on water-cooled tubes.

I claim:

1. In a fluidised bed process for the treatment of particulate solid material by gas with periodical shut-off of the gas supply, forming a fluidised bed of said material by the passage of gas into a mass of said material through a horizontal bed support having a plurality of openings so small as substantially to prevent the passage of particles of said material through them, continuing the flow of said gas upwards into and through a further mass of said material through a horizontal support for said further mass having a plurality of further openings, said further openings being of a diameter at least five times the size of the largest particles of the material, said openings having a total area of not more than about 3% of the cross-sectional area of the chambers, thereby forming said further mass into a fluidised bed, providing a baffle closely below each such further opening blocking the downward flow of material passing through the opening, and thereby building up a heap of material beneath each such further opening to a sufficient height to close the opening.

2. A container divided into compartments by two or more horizontal supports one above another, fluidised beds of particulate solid material, on said supports the bottom support having openings permitting the upward flow of gas into the material but substantially preventing the passage of the particles through them, and in the openings the remaining support or supports having a total area of not more than about 3% of the cross-section of the chamber and being sufficiently larger than the openings in the bottom support for the material to pass through them, and a baffle below each opening in said remaining supports at such a vertical distance of not more than about one-fourth inch below and extending so far laterally beyond the opening as to enable material that passes through each opening when no gas is flowing to build up on the baffle as a heap sealing the opening.

References Cited in the file of this patent

UNITED STATES PATENTS

| | | |
|---|---|---|
| 2,589,984 | Borcherding | Mar. 18, 1952 |
| 2,715,565 | McKay | Aug. 16, 1955 |

FOREIGN PATENTS

| | | |
|---|---|---|
| 845,655 | Great Britain | Aug. 24, 1960 |
| 1,058,923 | France | Mar. 19, 1954 |